United States Patent [19]

Carnevale et al.

[11] Patent Number: 4,650,015
[45] Date of Patent: Mar. 17, 1987

[54] BALANCE BEAM SCALE HAVING DIGITAL DISPLAY

[75] Inventors: Francesco L. Carnevale, Waynesboro, Miss.; Michael J. Norton, Huntsville, Ala.

[73] Assignee: Sunbeam Corporation, Oak Brook, Ill.

[21] Appl. No.: 837,420

[22] Filed: Mar. 7, 1986

[51] Int. Cl.$^4$ .................. G01G 3/14; G01G 23/00; G01G 1/36

[52] U.S. Cl. .................................. 177/211; 177/245; 177/249

[58] Field of Search .................. 177/216, 249, 245

[56] References Cited

U.S. PATENT DOCUMENTS 2,955,811 10/1960 Jonas et al. .................... 177/211 X
3,812,924 5/1974 Fletcher et al. ................ 177/211 X
4,113,040 9/1978 Storace ........................... 177/211

*Primary Examiner*—George H. Miller, Jr.

*Attorney, Agent, or Firm*—Mason, Kolehmainen, Rathburn & Wyss

[57] ABSTRACT

A beam scale includes a single weight mounted on a balance beam which is movable to selected positions to establish ranges of weights to be measured. The beam is supported by a flexible member to which a strain gage mechanism is secured to provide a vernier weight signal. The electronic circuitry associated with the scale receives signals indicative of the adjustable weight position and indicative of the deflection of the beam supporting member and totalizes these signals to produce and display a number indicative of the weight applied to the scale. The scale permits the user operator to perform a simple calibration procedure which guarantees the accuracy of subsequent measurements by zeroing the scale and calibrating it between the zero and fifty pound setting of the adjustable weight. This provides a balance beam scale which has greater accuracy than conventional mechanical balance beam scales and is far easier to use, particularly by an untrained person.

17 Claims, 16 Drawing Figures

BALANCE BEAM SCALE HAVING DIGITAL DISPLAY

BACKGROUND OF THE INVENTION

This invention relates generally to weighing scales and more particularly to beam scales of the type used by doctors to weigh their patients.

Typically, the beam scale involves a platform with some type of force collecting lever arrangement and an adjacent column supporting a balance beam which is interconnected by levers and links to the force collecting means associated with the platform. The force applied to the platform is transmitted to one end of the pivoted beam and adjustable weights are supported on the beam on the other side of the pivot to permit the user to balance the force applied to the platform by adjusting the distance of the weights from the pivot point. Such a scale has provided accurate and reliable weight information but requires some skill and experience to operate it properly. In addition, the adjustment of the weights and the balancing of the beam accurately is time consuming.

With the availability of inexpensive microprocessors, the weighing scale industry has been moving in recent years toward the use of electrical and electronic measuring and indicating means for weighing scales. These scales involve the use of either electronic means for measuring and displaying the displacement of the conventional spring biased platforms or the use of strain gages to produce an electrical signal proportional to the applied load and circuit means for converting this signal into a display of the weight. Many different approaches have been employed in the location and positioning of the strain gages in order to obtain an accurate and consistent response to the load applied to the scale. Various arrangements of mechanical levers have been used to collect the force and apply such force to one or more flexible beams to which the strain gages may be affixed. The deflection of such beams are sensed by the strain gages, giving an indication of the load applied to the scale. Examples of several of such prior art strain gage scales are shown in the patents to Provi et al U.S. Pat. No. 4,050,532, Provi U.S. Pat. No. 4,457,385, Belcher U.S. Pat. No. 4,223,752, Jushmuck U.S. Pat. No. 4,241,801 and Oejelid U.S. Pat. No. 3,894,594.

It has also been known in the prior art to use strain gage measuring means in connection with beam scales. Examples of such scales are shown in the patents to Nyhold U.S. Pat. No. 4,036,318 and Fletcher et al U.S. Pat. No. 3,812,924 and Storace U.S. Pat. No. 4,113,040. The Nyholm patent discloses a lever equipped with strain gages to measure the deflection of a balance beam and thereby produce a weight indication. In the Storace patent, the strain gage is used to sense unbalance of the beam and to rebalance it rather than to produce a signal the magnitude of which indicates the weight measurement. The Fletcher patent employs a balance beam with a flexible support monitored by a strain gage to measure changes in the weight of a specimen.

It has also been known in the prior art to combine beam scales with mechanisms which permit use of the adjustable weights of the beam scale along with a separate readout mechanism which will avoid the time consuming chore of making the vernier weight adjustments to arrive at the total weight. One such patent in Stahmer U.S. Pat. No. 3,227,233. In the Stahmer patent, the total weight in the scale is obtained by adding the weight indicated by the slidable weight position to the reading provided by a dial indicator on the scale. It is also known in the prior art to provide a beam scale with means for automatically applying and removing weights of the beam to balance the applied load. This type of mechanism is shown in the patent to DeMasters et al U.S. Pat. No. 4,106,580. The DeMasters et al patent uses load cells or differential transformers to automatically rebalance the beam of the scale disclosed therein.

None of the above-cited prior art patents discloses a practical balance beam scale utilizing a strain gage sensing mechanism.

BRIEF SUMMARY OF THE INVENTION

The present invention comprises a beam scale wherein a single weight is provided which is movable to selected positions to establish ranges of weights to be measured. The beam is supported by means of a flexible member to which a strain gage mechanism is secured to provide a vernier weight signal. The electronic circuitry associated with the scale receives signals indicative of the adjustable weight position and indicative of the deflection of the beam supporting member and totalizes these signals to produce and display a number indicative of the weight applied to the scale.

The scale also includes means permitting the user to provide a simple initial calibration procedure which guarantees the accuracy of subsequent measurements by zeroing the scale and calibrating it between the zero and fifty pound setting of the adjustable weight. This provides a balance beam scale which is more accurate than the conventional mechanical balance beam scale. Additionally, it is far easier to use, particularly by an untrained person.

Accordingly, it is an object of the present invention to provide an improved balance beam scale which requires no vernier weight adjustment and which provides a digital display of the measured weight.

Another object of the present invention is to provide a balance beam scale having means for totaling a balance weight position signal with a strain gage signal to provide a display of a total weight measurement.

A further object of the present invention is to provide an improved balance beam scale having the beam supported on a flexible stain gage equipped member which provides a signal for combination with a second signal indicative of the position of an adjustable weight on said beam.

It is another object of the invention to provide an improved balance beam scale having a calibration procedure which may be performed easily by following displayed instructions.

It is still another object of the invention to provide a balance beam scale having a pivoted beam supporting an adjustable balancing weight movable to any one of a plurality of discrete positions and strain gage measuring means to provide a vernier signal indication which is combined with a weight position signal and displayed as the total weight.

DESCRIPTION OF THE DRAWING

These and other objects and advantages of the present invention will become apparent on consideration of the following detailed description and attached drawing, wherein:

FIGS. 13A-13D comprise a flow chart illustrating logical steps performed by a microprocessor of the beam scale of FIG. 1.

DESCRIPTION OF THE PREFERRED EMBODIMENT

Figures 1, 5, 6, 7:
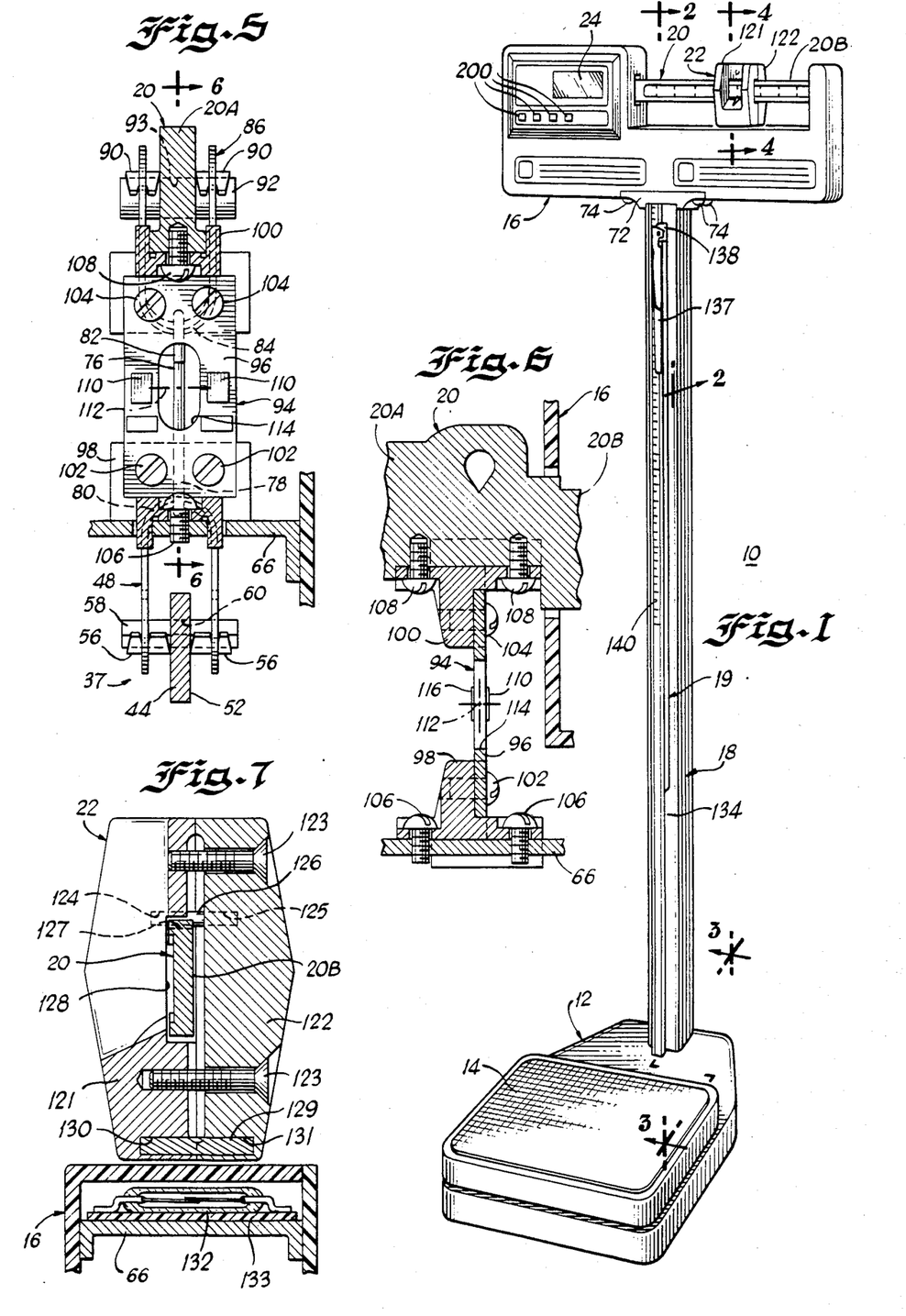
FIG. 1 is a perspective view of a beam scale constructed in accordance with the principles of the present invention.
FIG. 5 is an enlarged cross-sectional view taken substantially along the line 5—5 of FIG. 2.
FIG. 6 is a cross-sectional view taken along the line 6—6 of FIG. 5.
FIG. 7 is an enlarged cross-sectional view taken along the line 7—7 of FIG. 4.

Referring to the drawing and initially to FIG. 1, there is illustrated a new and improved beam scale generally designated as 10 constructed in accordance with the principles of the present invention. The beam scale 10 includes a base support assembly 12 having a movable platform 14 for receiving a load to be weighed, a housing 16 and an elongated post 18 extending between the base support assembly 12 and the housing 16. A height rod 19 is mounted within the post 18 and height indicia is provided on the post 18, as shown. A balance beam 20 is arranged for receiving a force proportional to the weight of the load applied to the movable platform 14. A sliding weight or poise 22 is mounted on the balance beam 20 for movement between preselected positions (FIG. 2) along the beam 20 to counterbalance a substantial portion of the weight of the load placed on the platform 14. The poise 22 is manually moved between the preselected positions that correspond to known increments of weight, for example, between zero and 350 pounds in incremental steps of 50 pounds. A display device 24 displays characters for indicating the weight of the object being weighed and status and instruction messages for viewing by the user of the beam scale 10.

Figures 2, 3, 4:
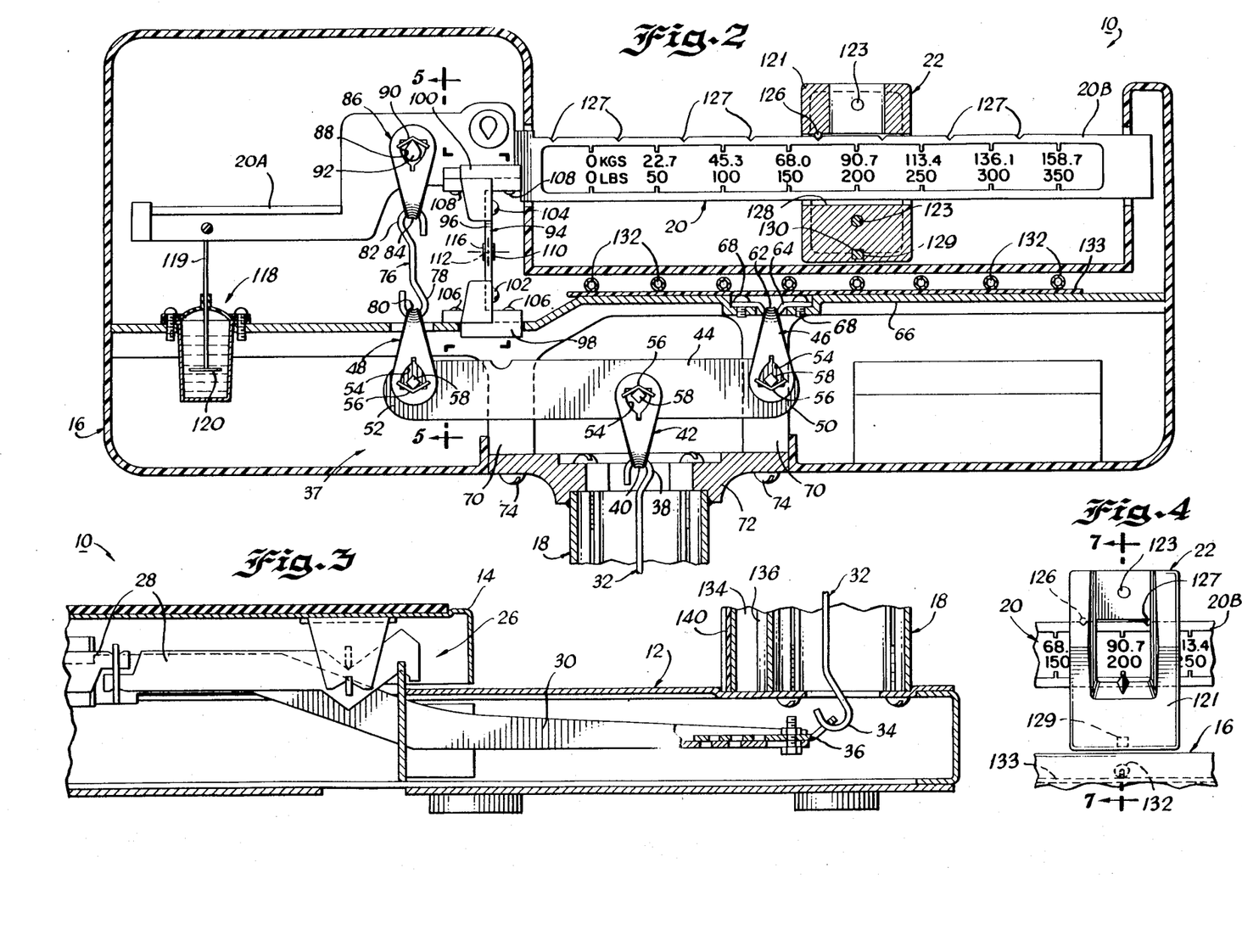
FIG. 2 is an enlarged, cross-sectional view taken along the line 2—2 of FIG. 1.
FIG. 3 is an enlarged, cross-sectional view taken along the line 3—3 of FIG. 1.
FIG. 4 is an enlarged, fragmentary elevational view taken along the line 4—4 of FIG. 1.

Referring to FIG. 3, a force collecting assembly 26 supports the movable platform 14 and is arranged for corresponding movement with the platform 14. A plurality of interacting levers 28 and 30 move to produce a force proportional to the weight of an object placed on the platform 14. A connecting rod 32 extends within the post 18 and includes a lower hooked end portion 34 that is connected in operative relation to the lever 30. An adjusting bracket 36 provides adjustable abutments to the lever 30.

Referring to FIG. 2, an upper linkage assembly 37 includes an upper hooked end portion 38 of the connecting rod 32 that is received within a bight portion 40 of a beam loop 42. The beam loop 42 is pivotably mounted on a multiplying lever 44. A pair of beam loops 46 and 48 are pivotably mounted on opposite terminal end portions 50 and 52, respectively, of the multiplying lever 44. Each of the beam loops 42, 46 and 48 has a pair of axially aligned apertures 54 formed in opposite sides. Each aperture 54 receives a V-bearing 56 for engaging a square pivot pin 58 that extends between the apertures 54 and is received and retained within a plurality of apertures 60 (FIG. 5) in the multiplying lever 44.

A bight portion 62 of the beam loop 46 is received and retained within a bracket 64. The bracket 64 is secured to a rigid frame 66 by a pair of fasteners 68. The frame 66 includes a plurality of downwardly depending legs 70 that are secured to a post collar cap 72 by a plurality of fasteners 74.

Force is transferred from the multiplying lever 44 to the balance beam 20 through a connecting rod 76 having a lower hooked end portion 78 received within a bight portion 80 of the beam loop 48. An upper hooked end portion 82 of the connecting rod 76 is received within a bight portion 84 of a beam loop 86 that is pivotally secured to the balance beam 20. The beam loop 86 includes a pair of axially aligned apertures 88 formed in opposite sides of the loop for receiving a V-bearings 90 that engage a tear-drop or square pivot pin 92 that extends between the apertures 88 through an aperture 93 (FIG. 5) within the balance beam 20.

Referring also to FIGS. 5 and 6, a strain gage transducer assembly 94 is illustrated. The strain gage transducer assembly 94 includes a flexible member 96 extending between a lower transducer bracket 98 and an upper transducer bracket 100. The flexible member 96 is secured to the lower transducer bracket 98 and the upper transducer bracket 100 by a pair of fasteners 102 and 104, respectively. The lower transducer bracket 98 is fixedly secured to the rigid frame 66 by a pair of fasteners 106. The upper transducer bracket 100 is fixedly secured to the balance beam 20 by a pair of fasteners 108.

Figure 8:
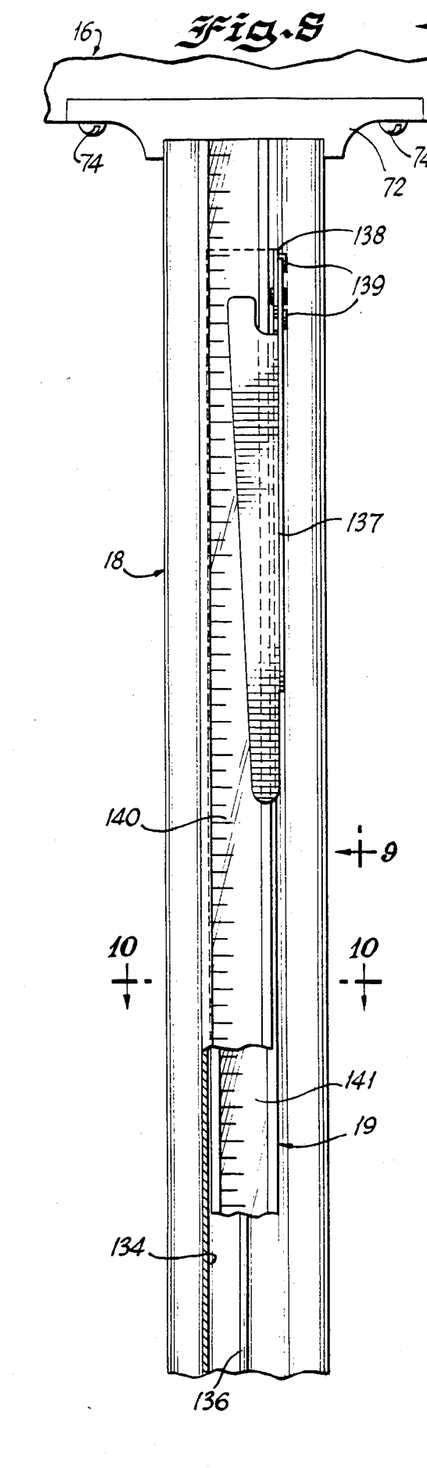
FIG. 8 is an enlarged, partial front elevational view of FIG. 1 having portions broken away to show interior details.
Figures 9, 10:
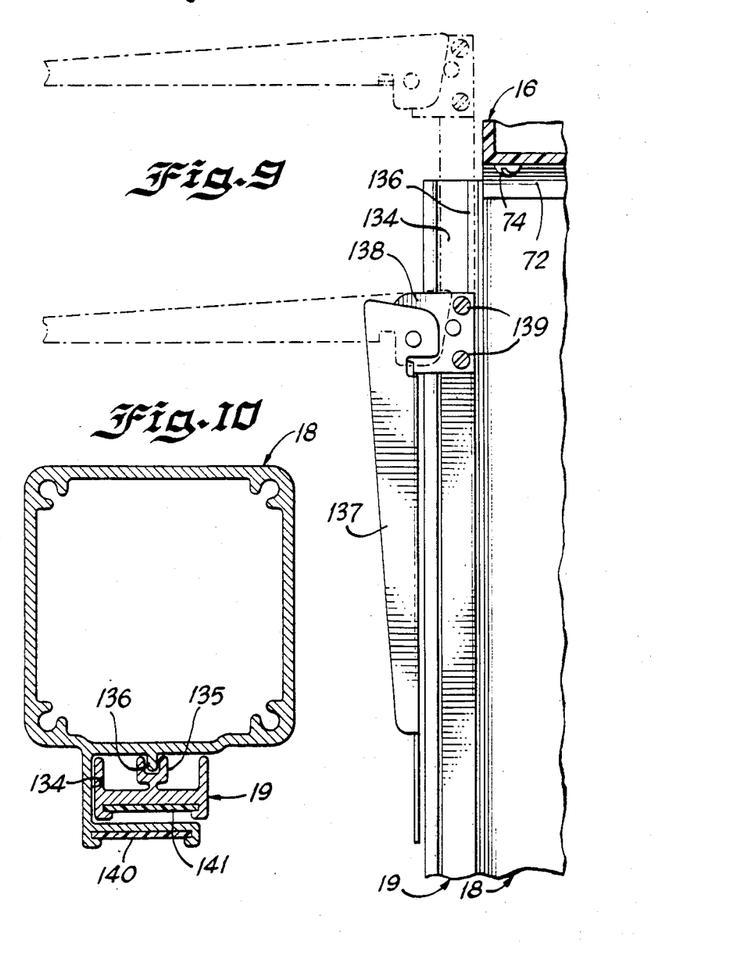
FIG. 9 is an enlarged, side elevational view taken along the line 9—9 of FIG. 8.
FIG. 10 is an enlarged, cross-sectional view taken along the line 10—10 of FIG. 8.
Figure 11:
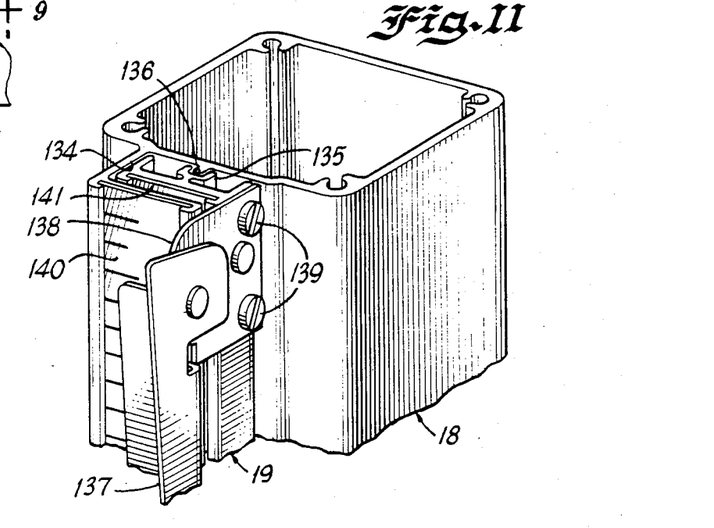
FIG. 11 is an enlarged perspective view of a support portion of the beam scale of FIG. 1.

A first pair of strain gages 110 are bonded to the flexible member 96 along a center-line 112 of the flexible member 96. The strain gages 110 are spaced apart on opposite sides of a centrally disposed aperture 114 formed within the flexible member 96. A second pair of strain gages 116 are bonded to the opposite sides of the flexible member 96 axially aligned with the strain gages 110. The pairs of strain gages 110 and 116 are connected in the form of a strain gage bridge 117 (FIG. 8) that generates a signal proportional to the portion of weight applied to the movable platform 14 that is in excess of the portion counterbalanced by the preselected position of the poise 22.

An oil damper assembly 118 is fixedly secured to the frame 66 and includes a piston rod 119 that is fixedly secured to the balance beam 20 as shown in FIG. 2. A piston 120 is attached to the lower, free end of the piston rod 119 and is immersed in a high viscosity oil contained within the oil damper assembly 118. The piston 120 moves up and down through the oil due to vertical oscillations of the piston rod 119 and dampens the vertical movement. The piston 120 moves freely through the oil without apparent drag or friction.

Referring now to FIG. 7, there is shown a detail illustrating the poise 22. The poise 22 is formed by a front section 121 and a mating rear section 122 that are secured by a pair of fasteners 123. A pair of apertures 124 and 125 are defined within mating sections 121 and 122 respectively for receiving a positioning rod 126. Rod 126 seats in detents 127 to define the preselected positions along the beam 20 corresponding to known increments of weight. The front section 121 includes a recessed portion 128 for receiving the balance beam 20 between the sections 121 and 122.

A magnet 129 is captured within suitable apertures 130 and 131 defined within mating sections 121 and 122 for activating an adjacent one of a plurality of reed switches 132. Referring to FIGS. 2 and 7, the reed switches 132 are located on a printed circuit board 133 mounted in the housing 16 adjacent the magnet 129 carried by the poise 22 at 50 pound incremental positions.

Considering the operation of the beam scale 10, referring to FIGS. 1–3, a downward force placed upon the movable platform 14 will produce a corresponding downward force on the connecting rod 32 through the force collecting assembly 26. This downward force will tend to rotate an arm 20A of the balance beam 20 counterclockwise about a fulcrum indicated at 112 of the transducer assembly 94 through the upper linkage assembly 37. This counterclockwise movement is counterbalanced in substantial portion by the operator moving the poise 22 along an opposite arm 20B of the balance beam 20 to a suitable detented position.

Operational instructions are provided on the display 24 for moving the poise 22 to the appropriate detected position. When the weight applied is more than 50 pounds, the display will show "INCREASE WT" to instruct the operator to move the poise 22 to the right to the adjacent detented position. After the operator moves the poise 22 to the increased weight position, the display will again show "INCREASE WT" if the weight detected by the strain gage transducer assembly 94 is more than 50 pounds. If the poise 22 is moved past the appropriate detected position, the display 24 will show "DECREASE WT" to instruct the operator to move the poise 22 to the right to the adjacent detented position. When the poise 22 is moved to the appropriate detented position, the display 24 will show "WAIT", for example, for five seconds while the user's weight is computed. The display 24 will then show the weight in either pounds or kilograms.

Referring to FIGS. 8–11, the height rod 19 is mounted within a channel 134 formed in the post 18. The height rod 19 includes an inwardly facing central portion 135 configured for slidably engaging a retaining rib 136 formed within the channel 134. A height bar 137 is pivotably secured to a bracket 138 that is fixedly secured to the height rod 19 by a pair of fasteners 139. A first height label 140 is affixed to the post 18 and a second height label 141 is affixed to the height rod 19.

To measure height, the user stands on the platform 14 and manually moves the height rod 19 and the height bar 137, placing the height bar 137 on top of the user's head. The height of the user is read from the label 141 on the height rod 19 or from the height label 140 on the post 18 depending on whether the user's height is more than the length of the post 18.

Figure 12:
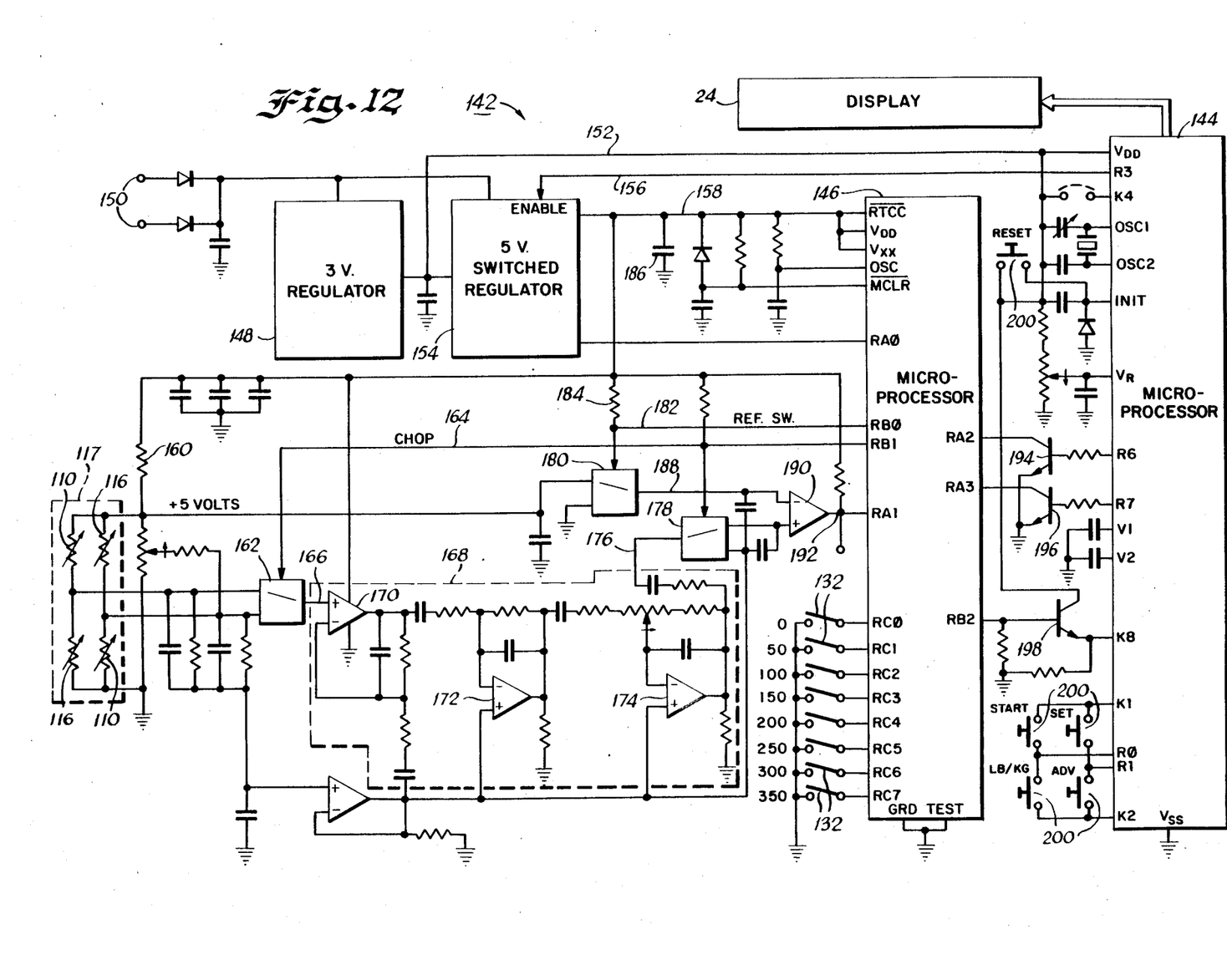
FIG. 12 is a schematic representation of electrical circuitry of the beam scale of FIG. 1.

Referring now to FIG. 12, there is shown a schematic representation of exemplary electrical circuitry designated as 142 of the beam scale 10. The electrical circuit 142 includes a microprocessor 144 for driving the display 24 and a second microprocessor 146 for performing the beam scale program according to the invention. Although various microprocessor devices having standard capabilities can be employed for the display microprocessor 144 and the scale microprocessor 146, a 4-bit complementary metal oxide semiconductor CMOS microprocessor that has provisions for driving liquid crystal displays such as a Seiko microprocessor device SMC 1112F2J advantageously may be employed for the display driving microprocessor 144 and an 8-bit N-type metal oxide semiconductor NMOS microprocessor device such as a G.I. microprocessor device type PIC 1655A advantageously may be employed for the scale program microprocessor 146.

A voltage regulator 148 is coupled to an external power source 150 and provides a regulated DC voltage output at line 152 that is applied to the microprocessor 144. A switched voltage regulator 154 receives an ENABLE input signal at line 156 from the microprocessor 144 and provides a regulated voltage output at line 158 that is applied to the scale program microprocessor 146 responsive to the ENABLE signal from the microprocessor 144.

The regulated voltage output at line 158 is coupled to the strain gage bridge 117 through a current limiting resistor 160. The output signal of the strain gage bridge 117 is applied to a solid state switch 162, such as a CMOS integrated circuit device type CD 4053. The microprocessor 146 provides an AC square wave drive signal CHOP at line 164 to the digital switch 162. An AC output signal at line 166 is applied to an amplifier circuit 168 to amplify the AC strain gage signal. The amplifier circuit 168 includes series connected operational amplifiers 170, 172 and 174 and associated biasing circuitry to provide three stages of amplification. The operational amplifiers 170, 172 and 174 may be provided by a single integrated circuit device type LM 324, quad differential input operational amplifier sold by Motorola, Inc.

The amplified AC strain gage signal of the amplifier circuit 168 at line 176 is applied to a solid state switch 178 that functions as a synchronous rectifier to convert the amplified AC strain gage signal to a DC signal. The solid state switch 178 conveniently may be the same type as the solid state switch 162. The CHOP drive signal at line 164 from the microprocessor 146 is applied to the solid state switch 178. A solid state switch 180 receives a REF. SW. drive signal at line 182 from the microprocessor 146 for switching between a maximum positive voltage potential and a maximum negative voltage potential at the junction of a resistor 184 and the input to the solid state switch 180. The resistor 184 is connected in series with the capacitor 186 for averaging an output signal at line 188 from the solid state switch 180. That is applied to an inverted input of a comparator 190. The amplified DC strain gage signal is applied to a noninverting input of the comparator 190. The REF. SW. signal is driven low when the reference input to the comparator 190 is higher than the output of the amplified DC strain gage signal; otherwise the REF. SW. signal is driven high. The comparator output at line 192 is applied to the microprocessor 146 and an analog-to-digital conversion is performed by measuring the fraction of the time that the REF. SW. drive signal must be held high with the conversion process being synchronized with the CHOP signal. The comparator 190 may be, for example, an integrated circuit device type LM 393 sold by Motorola, Inc.

The reed switches 132 are connected to eight parallel input pins on the microprocessor 146. The position of the poise 22 on the balance beam 20 is sensed by the activation of one of the reed switches 132 that is adjacent to the magnet 129 in a particular preselected position (FIG. 2) corresponding to the predetermined incremental weights between 0 and 350 pounds, as shown.

Communications between the scale program microprocessor 146 and the display driving microprocessor 144 is enabled via transistors 194, 196 and 198 and associated biasing resistors as shown. The display driving microprocessor 144 provides a clock signal at the line CLK that is applied to the microprocessor 146 via transistor 194 for controlling the rate of transmission of serial data between the microprocessors. Command messages from the microprocessor 144 at the line CMD are sent to the scale program microprocessor 146 via transistor 196. Data from the scale program microprocessor 146 is coupled by transistor 198 to the display driving microprocessor 144.

A plurality of manually operated switches 200 are disposed within the housing 16 (FIG. 1) to enable manual control inputs by the user/operator of the beam scale 10. The manually operable switches 200 are coupled to the display driving microprocessor 144 and can include, for example, a START switch, SET switch, an ADVANCE switch for setting a display clock, a LB/KG selection switch and a RESET switch.

The operation of the beam scale 10 will be described with reference to the flow chart shown in FIGS. 13A-13D. The flow chart represents the beam scale program performed by the microprocessor 146. The operator initiates an operational sequence of the beam scale 10 by depressing the START switch 200. The operational sequence begins with power applied to the microprocessor 146 responsive to the ENABLE input from the microprocessor 144. A user CALIB or WEIGHT command determines whether a calibration sequence or a weighing sequence first will be performed. The calibration sequence is automatically initiated upon the installation of the beam scale 10 prior to a first weighing sequence. Thereafter the user of the beam scale 10 would initiate the calibration sequence at periodic intervals, for example, once a week and following certain events such as moving the beam scale 10. If a CALIB command is received, the calibration flag is set. Otherwise, for a WEIGH command, the calibration flag is cleared.

For both the calibration sequence and the weighing sequence, the poise 22 is first provided in the zero pounds predetermined position. If the poise 22 is not in the zero position, an instructional message "ERROR, STEP OFF THE SCALE, MOVE WEIGHT TO ZERO" is displayed in a flashing mode. After the poise 22 has been moved to the zero position, the display 24 will show "WAIT" for a predetermined period of time, for example, for two seconds. While the WAIT status message is displayed for viewing by the user, an "LCONV" subroutine (FIG. 13C) is performed. The LCONV subroutine performs successive analog-to-digital conversions (CONV subroutine) of the output of the comparator 190 (FIG. 12). The resulting conversion counts of successive conversions are compared until two conversions are within two counts, then a stable reading flag is set. Otherwise seven conversions are performed and the stable reading flag is cleared. A resulting count value is then stored that equals the sum of the last two counts minus a zero reference reading. The resulting output count is equivalent to twice the average value of a strain gage reading with a predetermined number of counts corresponding to one pound, for example, 32 counts per pound. The predetermined number of counts per pound is determined by the calibration count result divided by a known poise weight position, for example, 50 pounds. If a stable reading is not obtained or if the reading is outside a predetermined range, for example, further than ten pounds from a nominal zero reading, a status message is displayed indicating that an error has occurred. Then the microprocessor 146 waits for power off. If a stable reading within the predetermined range is obtained, this reading is stored as the zero reference.

Figure 13B:
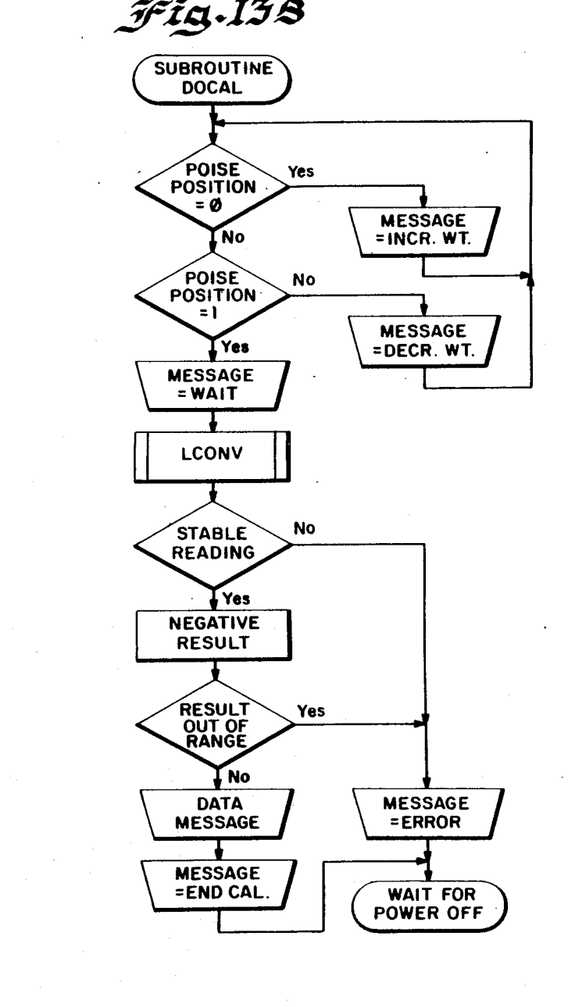
Figure 13C:
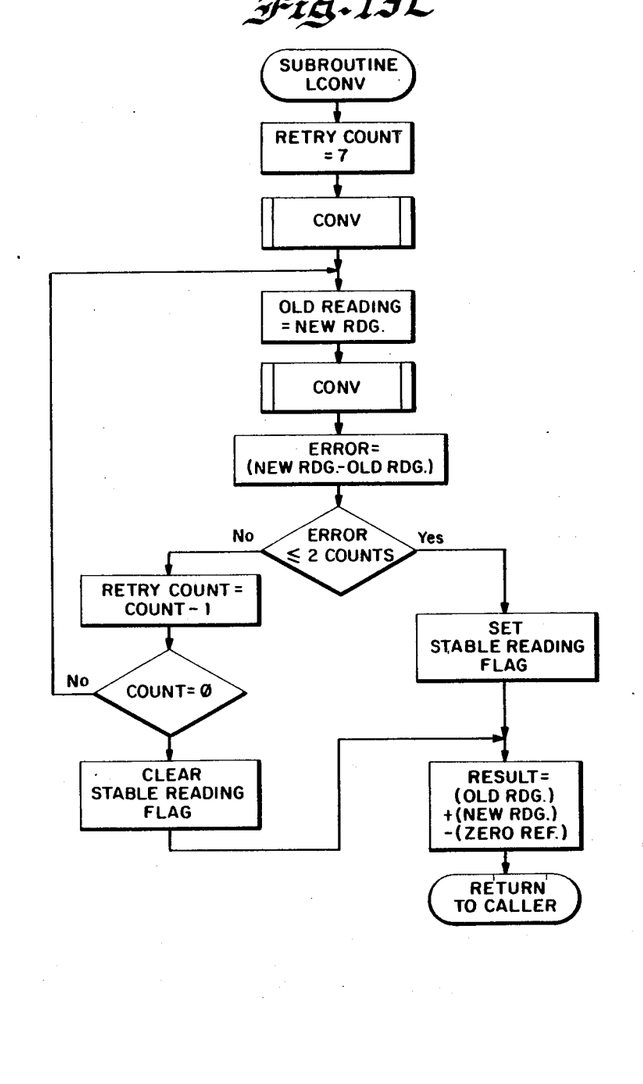

After the zero reference reading is stored, the calibration sequence is performed when the calibration flag is set. The calibration sequence includes a subroutine indicated as "DOCAL" that is illustrated in FIG. 13B and is later described.

When the calibration flag is not set, the weighing sequence continues with a "STEP ON" status message displayed by the display 24 to instruct the user to step on the scale. After a weight is applied to the platform 14, a subroutine indicated as "QCONV" (FIG. 13D) is performed.

Figure 13D:
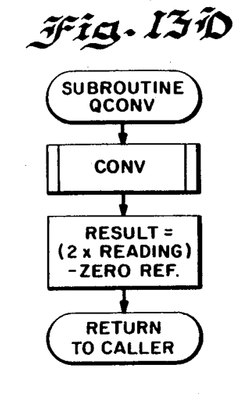
Figure 17A:
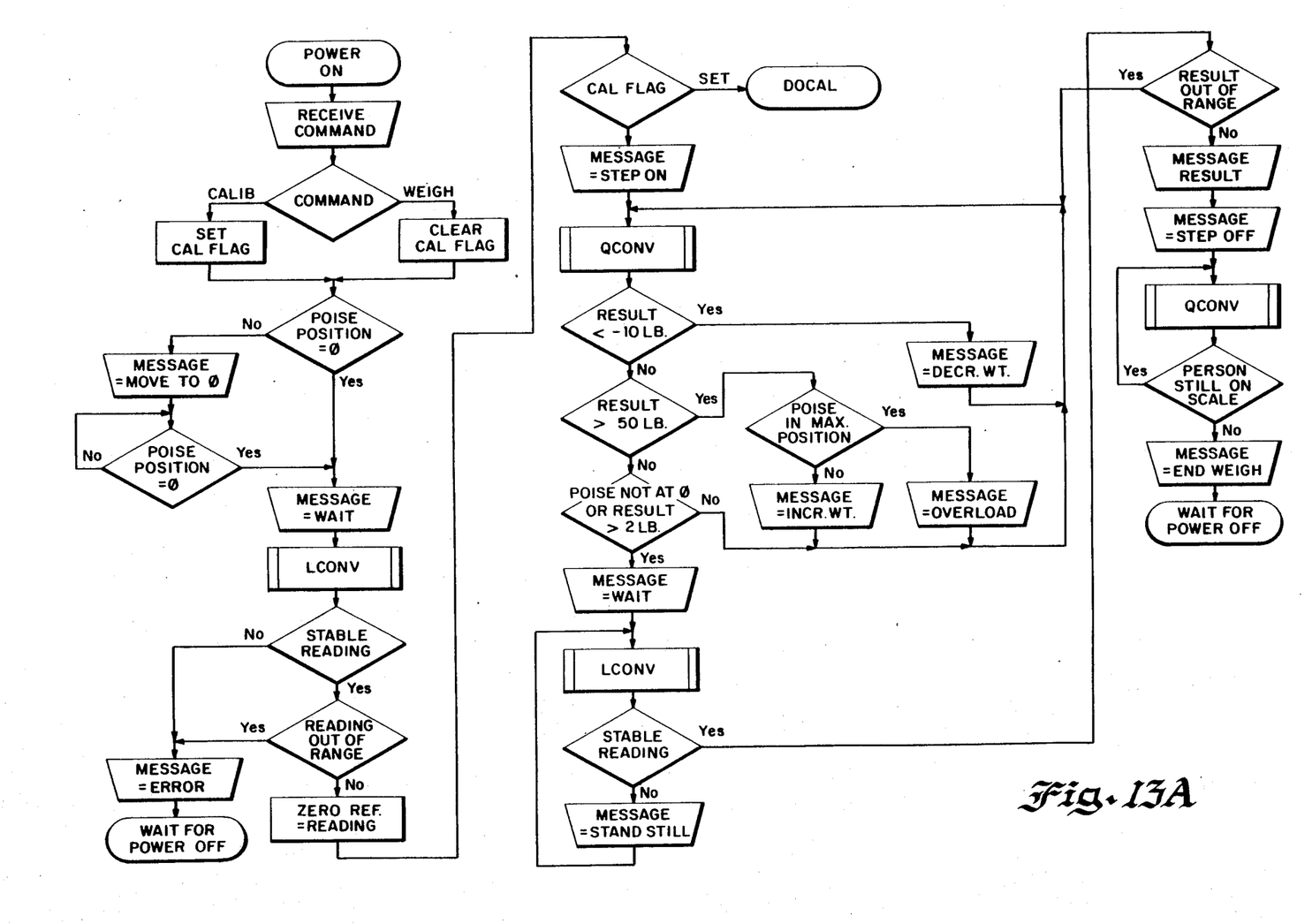

The QCONV subroutine performs a single analog-to-digital conversion of the output of the comparator 190. The resulting output count is doubled and the zero reference reading is subtracted. The result of the QCONV subroutine is compared to a predetermined count value corresponding to negative ten pounds from the nominal zero reading. If the result is greater than negative ten pounds from the nominal zero reading, a status message "DECREASE WEIGHT" is displayed in a flashing mode and the QCONV subroutine is repeated. If the result is less than negative ten pounds, the result is compared to a predetermined count value corresponding to fifty pounds. If the result is greater than the fifty pound count and the poise 22 is not in the maximum position of 350 pounds, a status message "INCREASE WT" is displayed in a flashing mode to instruct the user to move the poise 22 to the next predetermined detented position and the QCONV subroutine is again repeated. If the poise 22 is in the maximum 350 pound position and the result count is greater than 50 pounds, a status message "OVER CAPACITY" is displayed.

When the poise 22 is in the correct position to counterbalance the substantial portion of the weight placed on the platform 14, the "WAIT" message is displayed and the LCONV subroutine is repeated. If a stable reading is not obtained, a status message "STAND STILL" is displayed and the LCONV subroutine is again repeated. Once a stable reading is obtained, the result is compared to a predefined range. If the result is outside the predefined range, the above-described steps are repeated. When the resultant value is within the range, the microprocessor 146 transfers the poise position data and the conversion resulting data to the display microprocessor 144 for displaying the weight of the object on platform 14. An instruction message "STEP OFF SCALE" is displayed. The QCONV subroutine is performed to determined that the load has been removed from the scale and then a message "END WEIGHT" is displayed. The microprocessor 146 then waits for power off.

Referring now to FIG. 13B, the calibration sequence is illustrated. The DOCAL subroutine starts with instructions for the user to place the poise 22 in the first position to the right of the zero position (FIG. 2) which corresponds to a 50 pound position. If the poise 22 is in the zero position, a status message "INCREASE WT" is displayed to instruct the user to increase the poise position. If the poise 22 is above the 50 pound position, a status message "DECREASE WT" is displayed. When the poise 22 is in the correct 50 pound position, a "WAIT" status message is then displayed. The before described LCONV subroutine is then performed. If a stable reading is not obtained, an ERROR message is displayed and the microprocessor 146 waits for power off. Otherwise, when a stable reading is obtained, a result is stored corresponding to the sum of the last two conversion readings minus the zero reference value. The calibration stored result corresponds to a negative 50 pound reading. The stored calibration result is compared to a predetermined range as a test for reasonableness. If the result is within the predetermined range, the display microprocessor 144 goes into the clock mode and time is displayed to inform the user that the calibration sequence is completed. Otherwise, if the result is outside the predetermined range, an "ERROR" message is displayed and the microprocessor 146 waits for power off.

Although the present invention has been described in connection with details of the preferred embodiment, many alterations and modifications may be made without departing from the invention. Accordingly, it is intended that all such alterations and modifications be considered as within the spirit and scope of the invention as defined in the appended claims.

What is claimed and desired to be secured by Letters Patent is:

1. An electronic weighing scale comprising a movable platform for receiving a load to be weighed, a force collecting means supporting said platform to generate a force proportional to the weight of said load, a balance beam supported for pivotal movement about a fulcrum intermediate its ends by a flexible member connected on one end to said beam and rigidly supported at its other end, linkage means interconnecting said force collecting means and said balance beam to transmit said proportional force to said beam producing a movement force on said beam to rotate it about said fulcrum, an adjustable poise mounted on said beam for movement between preselected positions, said poise in each position balances said beam against rotational forces produced by known increments of weight placed on said load platform, means associated with a strain gage on said member to produce a first electrical signal proportional to the moment of force tending to rotate said beam about said fulcrum, means sensing the position of said poise and producing a second electrical signal proportional to the weight represented by the position of said poise on said beam, output and display means which add said first and second electrical signals and produce a display equal to the weight applied to said platform.

2. The weighing scale of claim 1 wherein said means sensing the position of said poise includes a plurality of switches positioned along the path of movement of said poise as it moves to said various preselected positions with a single switch being actuated by said poise in each of said positions.

3. The combination of claim 2 wherein said switches are fixedly mounted and are magnetically actuated by movable means carried by said poise.

4. The combination of claim 1 wherein said scale includes a base supporting said movable platform, a column extending upwardly from said base forming a housing within which said linkage means is disposed, a transversely extending support and enclosure for said balance beam at the top of said column, said poise being accessible for manual adjustment to said preselected positions, and said display means being mounted on said transverse support and enclosure.

5. The combination of claim 4 wherein said balance beam extends horizontally within said transversely extending support and enclosure, said flexible member extending vertically and being secured at its upper end to said balance beam, said poise being positioned on said balance beam on one side of the connection between said flexible member and said beam and said linkage being connected to said beam on the other side of said connection so that said poise and said linkage means apply moments to said balance beam in opposite directions around said pivot, said strain gage means being mounted on said flexible member in the plane in which said member flexes as a consequence of the unbalanced forces acting on said balance beam.

6. The combination of claim 4 wherein said scale includes a height rod disposed within said column and being accessible for manual adjustment.

7. The combination of claim 1 wherein said output and display means include means for signaling a beam unbalance which is more than the difference between the selected position of said poise and the weight measurement equal to the next adjacent poise position.

8. The combination of claim 7 further including means for displaying instructions for adjusting said poise to a different one of said poise positions.

9. The combination of claim 1 wherein said output and display means includes means for calibrating said scale by defining a weight proportional reference signal responsive to said first electrical signal when said poise weigh in its first predetermined position spaced from the initial zero position and no load is applied to said movable platform.

10. An electronic weighing scale comprising a movable platform for receiving a load to be weighed, a force collecting means supporting said platform to generate a force proportional to the weight of said load, a balance beam supported for pivotal movement about a fulcrum intermediate its ends by a flexible member connected on one end to said beam and rigidly supported at its other end, linkage means interconnecting said force collecting means and said balance beam to transmit said proportional force to said beam producing a movement force on said beam to rotate it about said fulcrum, an adjustable poise mounted on said beam for movement between preselected positions, said poise in each position balances said beam against rotational forces produced by known increments of weight placed on said load platform, means associated with a strain gage on said member to produce a first electrical signal proportional to the moment of force tending to rotate said beam about said fulcrum, calibration means responsive to said first electrical signal when said poise is placed at a first predetermined position and no load is applied to said platform for defining a weight proportional reference signal, means for combining said first electrical signal and said weight proportional reference signal to produce a weight signal, means sensing the position of said poise and producing a second electrical signal proportional to the weight represented by the position of said poise on said beam, output and display means which add said weight signal and said second electrical signal and produce a display equal to the weight applied to said platform.

11. The weighing scale of claim 10 wherein said means sensing the position of said poise includes a plurality of switches positioned along the path of movement of said poise as it moves to said various preselected positions with a single switch being actuated by said poise in each of said positions.

12. The combination of claim 11 wherein said switches are fixedly mounted and are magnetically actuated by movable means carried by said poise.

13. The combination of claim 10 wherein said scale includes a base supporting said movable platform, a column extending upwardly from said base forming a housing within which said linkage means is disposed, a transversely extending support and enclosure for said balance beam at the top of said column, said poise being accessible for manual adjustment to said preselected positions, and said display means being mounted on said transverse support and enclosure.

14. The combination of claim 13 wherein said balance beam extends horizontally within said transversely extending support and enclosure, said flexible member extending vertically and being secured at its upper end to said balance beam, said poise being positioned on said balance beam on one side of the connection between said flexible member and said beam and said linkage being connected to said beam on the other side of said connection so that said poise and said linkage means apply moments to said balance beam in opposite directions around said pivot, said strain gage means being mounted on said flexible member in the plane in which said member flexes as a consequence of the unbalanced forces acting on said balance beam.

15. The combination of claim 13 wherein said scale includes a height rod disposed within said column and being accessible for manual adjustment.

16. The combination of claim 10 wherein said output and display means include means for signaling a beam unbalance which is more than the difference between the selected position of said poise and the weight measurement equal to the next adjacent poise position.

17. The combination of claim 16 further including means for displaying instructions for adjusting said poise to a different one of said poise positions.

* * * * *